United States Patent
Lerner

(10) Patent No.: US 10,154,031 B1
(45) Date of Patent: Dec. 11, 2018

(54) USER-WEARABLE SECURED DEVICES PROVIDED ASSURING AUTHENTICATION AND VALIDATION OF DATA STORAGE AND TRANSMISSION

(71) Applicant: Daniel Maurice Lerner, Missouri City, TX (US)

(72) Inventor: Daniel Maurice Lerner, Missouri City, TX (US)

(73) Assignee: IRONCLAD ENCRYPTION CORPORATION, Houston, TX (US)

( * ) Notice: Subject to any disclaimer, the term of this patent is extended or adjusted under 35 U.S.C. 154(b) by 0 days.

(21) Appl. No.: 16/005,281

(22) Filed: Jun. 11, 2018

Related U.S. Application Data

(63) Continuation-in-part of application No. 16/005,134, filed on Jun. 11, 2018, and a continuation-in-part of application No. 16/005,040, filed on Jun. 11, 2018.
(Continued)

(51) Int. Cl.
*H04L 29/06* (2006.01)
*G06F 21/32* (2013.01)
(Continued)

(52) U.S. Cl.
CPC .... *H04L 63/0861* (2013.01); *G06F 17/30283* (2013.01); *G06F 21/32* (2013.01);
(Continued)

(58) Field of Classification Search
CPC .................................................. H04L 63/0861
See application file for complete search history.

(56) References Cited

U.S. PATENT DOCUMENTS

| 4,578,530 A | 3/1986 | Zeidler |
| 5,227,613 A * | 7/1993 | Takagi ................ G06K 7/0008 235/380 |

(Continued)

FOREIGN PATENT DOCUMENTS

| EP | 3037999 A1 | 6/2016 |
| WO | 2016069052 A1 | 5/2016 |

OTHER PUBLICATIONS

Arias et al.; Privacy and Security in Internet of Things and Wearable Devices; Published in: IEEE Transactions on Multi-Scale Computing Systems (vol. 1, Issue: 2, Apr.-Jun. 1, 2015); IEEE Xplore (Year: 2015).*

(Continued)

*Primary Examiner* — Bradley Holder
(74) *Attorney, Agent, or Firm* — Guerry L. Grune; ePatentManager.com

(57) ABSTRACT

Described are user-wearable devices utilizing encryption authentication techniques to ensure security of any data transmission to and from these devices. In order to provide privacy and security of user-wearable device signals, unique encryption technology is employed together with the use of biometrics associated with each user. The user-wearable devices may be electronic and can include one or more circuits, power sources, displays, and transceivers with biometric data transceiver portions. The devices can establish communications with a counterpart communication device or system in order to provide the ability to perform specific secured transactions. The biometric data transceivers are capable of reading a user's encrypted biometric data and then transmitting the encrypted data to a user identity validation distributed auto-synchronous array (DASA) database which allows for decryption, identification, and authentication of both the user(s) and the transaction(s).

30 Claims, 3 Drawing Sheets

Related U.S. Application Data

(60) Provisional application No. 62/518,371, filed on Jun. 12, 2017, provisional application No. 62/518,337, filed on Jun. 12, 2017, provisional application No. 62/518,281, filed on Jun. 12, 2017.

(51) Int. Cl.
    *G06F 17/30*     (2006.01)
    *H04L 9/14*     (2006.01)
    *H04L 9/08*     (2006.01)
    *H04L 9/32*     (2006.01)
    *G06F 1/16*     (2006.01)

(52) U.S. Cl.
    CPC .............. *H04L 9/0866* (2013.01); *H04L 9/14* (2013.01); *H04L 9/3271* (2013.01); *G06F 1/163* (2013.01)

(56) References Cited

U.S. PATENT DOCUMENTS

| | | | |
|---|---|---|---|
| 5,825,890 A | | 10/1998 | Elgamal et al. |
| 6,154,636 A | * | 11/2000 | Wright ............... H04B 7/18506 340/517 |
| 6,160,998 A | * | 12/2000 | Wright ............... H04B 7/18506 340/945 |
| 6,522,867 B1 | * | 2/2003 | Wright ................ G05D 1/0055 340/945 |
| 6,959,086 B2 | | 10/2005 | Ober et al. |
| 7,181,016 B2 | | 2/2007 | Cross et al. |
| 7,382,883 B2 | | 6/2008 | Cross et al. |
| 8,205,091 B2 | * | 6/2012 | Buckley .............. G06F 21/6209 713/182 |
| 8,462,955 B2 | | 6/2013 | Ureche et al. |
| 8,825,999 B2 | | 9/2014 | Mohamed |
| 9,094,191 B2 | | 7/2015 | Avanzi et al. |
| 9,213,858 B2 | | 12/2015 | Sharma et al. |
| 9,465,953 B2 | | 10/2016 | Shasrma et al. |
| 9,521,123 B2 | | 12/2016 | Jueneman et al. |
| 9,600,676 B1 | * | 3/2017 | Farmer ................... G06F 21/62 |
| 9,703,985 B1 | | 7/2017 | Sanchez |
| 9,900,287 B1 | * | 2/2018 | Jooste ................. H04L 63/0428 |
| 2005/0076198 A1 | * | 4/2005 | Skomra ................... H04L 9/321 713/156 |
| 2005/0228986 A1 | * | 10/2005 | Fukasawa ............. H04L 9/0891 713/156 |
| 2011/0107086 A1 | * | 5/2011 | Soliman ................ H04L 9/0822 713/155 |
| 2011/0110364 A1 | * | 5/2011 | Fried ..................... G06Q 30/02 370/352 |
| 2011/0112901 A1 | * | 5/2011 | Fried ..................... G06Q 30/02 705/14.49 |
| 2012/0198538 A1 | | 8/2012 | Spring et al. |
| 2013/0332025 A1 | * | 12/2013 | Ziarno ............... G05B 23/0213 701/33.4 |
| 2014/0085050 A1 | * | 3/2014 | Luna .................. G07C 9/00087 340/5.82 |
| 2014/0279528 A1 | * | 9/2014 | Slaby .................. H04L 63/0853 705/44 |
| 2014/0282153 A1 | * | 9/2014 | Christiansen ...... G06Q 30/0201 715/765 |
| 2014/0337621 A1 | * | 11/2014 | Nakhimov .............. G06F 1/163 713/168 |
| 2015/0169882 A1 | * | 6/2015 | Saxena ................... G06F 21/36 726/17 |
| 2016/0294794 A1 | * | 10/2016 | Mancic ................ H04L 63/061 |
| 2016/0337328 A1 | * | 11/2016 | Sallam ................ H04L 63/0861 |
| 2017/0012642 A1 | | 1/2017 | Declercq et al. |
| 2017/0118207 A1 | * | 4/2017 | Madhu ................ H04L 63/0861 |

OTHER PUBLICATIONS

Snader et al.; CryptoCoP: Lightweight, Energy-efficient Encryption and Privacy for Wearable Devices; Published in: Proceeding WearSys '16 Proceedings of the 2016 Workshop on Wearable Systems and Applications; pp. 7-12; ACM Digital Library (Year: 2016).*

Polat, Ofir. International Search Report. Israel Patent Office, dated Sep. 6, 2018, Jerusalem, Israel.

Polat, Ofir. Written Opinion of the International Searching Authority. Israel Patent Office, dated Sep. 6, 2018, Jerusalem, Israel.

* cited by examiner

USER-WEARABLE SECURED DEVICES PROVIDED ASSURING AUTHENTICATION AND VALIDATION OF DATA STORAGE AND TRANSMISSION

PRIORITY STATEMENT

This application is a nonprovisional conversion of and takes priority under 119(e) of U.S. Provisional Application No. 62/518,371 filed Jun. 12, 2017 and entitled, "User-Wearable Secured Devices Provided with Encryption Assuring Authentication and validation of Data Storage and Transmission".

This application is also a continuation-in-part of U.S. Nonprovisional application Ser. No. 16/005,134 filed Jun. 11, 2018 and entitled "Securitization of Temporal Digital Communications Via Authentication and Validation for Wireless User and Access Devices" which is a nonprovisional conversion of US Provisional Application entitled "Securitizing Temporal Digital Communications Via Authentication and Validation for Wireless User and Access Devices" with Ser. No. 62/519,337, filed Jun. 12, 2017.

This application is also a continuation-in-part of U.S. Nonprovisional application Ser. No. 16/005,281, filed Jun. 11, 2018 and entitled "Securitization of Temporal Digital Communications with Authentication and Validation of User and Access Devices", which is a nonprovisional conversion of US Provisional Application entitled "A System for Securing and Encrypting Temporal Digital Communications with Authentication and Validation of User and Access Devices" with Ser. No. 62/518,281 filed Jun. 12, 2017.

In addition, each and every aspect of such applications are hereby fully incorporated by reference.

FIELD OF INVENTION

The technical field comprises cyber security. The present disclosure further relates to functional, user-wearable devices that transmit, receive, store, and may temporarily contain data using securitization techniques to protect as well as detect and allow only the proper user(s) of the data.

Users of these devices are provided with authentication and validation security, even when the devices are not in use. Specifically, the present invention describes devices, methods, and systems for authenticating not only the identity of one or more users, but the ability to obfuscate data that is sent to, from, and held within these user-wearable devices.

BACKGROUND

The use of "smart" wearable devices has its historic origins in the use of analogue timepieces—including pocket and wrist watches. Most of the five hundred year old history of watches consisted of the development of the mechanical watch. Watches evolved from portable spring driven clocks, which first appeared in 15th-century Europe. Portable timepieces were made possible by the invention of the mainspring in the early 15th century and most likely were developed by German clockmaker Peter Henlein. The invention of the quartz watch in the 1960s, which ran on electricity and kept time with a vibrating quartz crystal, proved a radical departure for the industry. During the 1980s quartz watches took over the market from mechanical watches, an event referred to as the "quartz crisis". The first digital electronic watch, a Pulsar LED prototype in 1970, was developed jointly by Hamilton Watch Company and Electro-Data, founded by George H. Thiess and started a new revolution wearable devices.

Developments in the 2010s have included smartwatches, which are elaborate computer enabled electronic devices designed to be worn on a wrist. Their ubiquitous use today most likely has its initial roots in military and espionage needs. Although they generally incorporate timekeeping functions, this has become only a small fraction of current smartwatch capabilities. In addition to timekeeping, the user now has the ability to perform consumer purchases and with the invention of credit and debit cards, is able to transact business on an electronic basis as never before. Debit cards draw from a positive account balance maintained by the user and require verification of identification, usually a personal identification number (PIN) to complete a purchase.

"Smart Cards" are another recent transaction device that also requires a personal identification number to complete a transaction. Smart Cards, like debit cards, execute purchases from a positive account balance but the balance is maintained in the card itself. Additions to the card balance must be properly purchased and, typically, Smart Cards have safeguards against an illicit account increase.

Credit and debit-card purchases require the use of a physical card or at least its entry into a purchasing system by number. Users of Smart Cards are not immune to the disadvantages above. A buyer of goods from an automatic Smart Card-reading vending machine is required to swipe the card through a slot. The buyer is then required to enter a PIN to verify his or her identity and authorization for a purchase. Systems have begun to emerge that allow the non-contact use of Smart Cards through RF or infrared technology. However, a PIN must still be entered at some point in the transaction. If a Smart Card is stolen and the thief is able to acquire the rightful user's PIN, then there is no safeguard remaining to prevent the thief s access to the Smart Card's entire balance.

A reliable means of determining the identity of a potential user of a Smart Card, and thus whether that person is an authorized user, is by the use of biometric data identification. Biometric data is data taken from the measurement of some characteristic peculiar to an individual. A digitized thumbprint is an example of biometric data. Iris scans, speech pattern scans or various body temperatures, pH or even electrical characteristics are biometric data that can be used for validating the authenticity of an individual or groups of individuals.

In a system that uses biometric data for identification, a device that reads biometric data scans the relevant measurement of the candidate for identification. The attached system then compares the scanned data with data stored in the Smart Card. A match of data sets is then sufficient for identification.

A more recent implementation of such a scheme is the use of a thumbprint scanner which can read the user's thumbprint and determine whether it compares favorably with a stored thumbprint. If the user's data does not compare favorably, the system to which the identifying device is connected refuses to allow access to either on-board data or a network or, in some cases, a purchase. An iris scanner or a speech pattern reader functions similarly, though may be somewhat more difficult to implement. Systems using biometrics often still require physical contact between a user and a system and the system can be bulky and expensive. One solution to this issue has been to develop user-wearable electronic devices utilizing wireless transactions. These devices include devices that comprises a housing that houses a wireless communication device, one or more electronic circuits, a power source, a display device and a biometric data reading device. While enabled as a timepiece or performing other functions suitable to a user-wearable device (apparatus), the device can establish wireless communication with a counterpart communication apparatus in order to conduct a transaction. The biometric data reading device can read the user's applicable biometric data and then transmit a user identity validation and the wireless communication device can transmit user authorization for the transaction.

Although these devices enable efficient and user-friendly electronic transactions that do not require physical contact and employ biometric data reading in its operation, the need still exists for a user to be able to authorize a completely secured electronic transaction by having a wearable device that provides encryption for at least three vital aspects;
 a) secured and uncompromised bio-identification of the user of the devices
 b) secured and uncompromised communications and transaction capabilities when using and/or wearing the devices
 c) secured and uncompromised access to the devices and all data contained within the user-wearable devices

SUMMARY OF THE INVENTION

The present invention provides one or more devices, methods, and systems for a user to enable and authorize an encrypted transaction by having user-wearable devices provide enhanced security for at least four vital functional needs;
 a) secured and uncompromised bio-identification of the user of the devices
 b) secured and uncompromised communications and transaction capabilities when using and/or wearing the devices
 c) secured and uncompromised access to the devices and all data contained within the user-wearable devices
 d) providing inoperability to the devices once removed from the designated, authorized, and validated users More specifically, the user-wearable devices must be capable of receiving and sending both encryption and decryption of each and every transaction associated with (in some cases continuous) bio-identification of the user as well as any transaction that the user determines should be carried out with the user-wearable devices. These transactions can include but are not limited to electronic, optical, radiative and other forms of signal generating energies. Most often these signals will be transmitted in a wireless fashion.

Most specifically, the present disclosure describes; one or more user-wearable transaction secured devices, comprising: a housing; a computer driven communication processor containing a microprocessor and data storage encryption capacity fixedly mounted in the housing; one or more circuits fixedly mounted in the housing and communicatively coupled with the computer driven communication processor; a power source coupled with the circuits; at least one transceiver and a biometric data transceiver portion coupled with the housing and coupled with the circuits and with the communication processor such that one or more sensors are held within or on one or more surfaces of the user wearable devices; wherein the devices transmit and receive encrypted signals that form specific transmissions determined by one or more users, to the transceiver; wherein the transceiver determines, via authentication and validation, identification of the users and confirms if the users are wearing the devices via utilization of the computer driven communication processor; wherein the communication processor provides, processes, and analyzes bio-identification, continuous bio-confirmation, and authentication of the users, wherein the authentication includes either high security or low security authentication requests. The circuits are connected to sensors or themselves function as sensors. The circuits are selected from the group consisting of; electronic, optical, and radiation emitting or receiving or both emitting and receiving energized circuits that transmit and receive signals. One or more display portions are communicatively coupled with the circuits.

The housing can be in a shape of a wristwatch, wherein the wristwatch incorporates features that provide functions for one or more devices selected from the group consisting of; a camera, a smartphone, a calculator, a global positioning system (GPS), a radio, a television, a door opener, or other remote energy switching device, and a transceiver, wherein the transceiver is capable of acting as an IP protocol data unit.

The housing is in a shape selected from the group consisting of; necklaces, broaches, rings, earrings, badges, belt buckles, assorted jewelry, and articles of clothing.

Here, the encrypted signals carry data that is transmitted and received by the at least one transceiver and wherein at least one transceiver analyzes and acts upon instructions contained within the data.

The sensors are biometric sensors that provide biometric data that comprises information used to confirm or deny access to said user-wearable devices.

Bio-identification initiates a process that requires user action to bio-identify users of user wearable devices followed by initial bio-confirmation and then authentication of said users to enable one or more transactions.

Bio-identification is continuously confirmed by authentication requests such that if bio-confirmation is not confirmed, a de-authenticate procedure is initiated that requires bio-identification confirmation to be re-initiated.

Authentication requests are high security requests that require users actively re-bio-identify themselves in order for the authentication requests to proceed and such that a test for bio-confirmation is maintained that results in a confirmation that allows for completion of authentication.

The authentication requests are low security requests that do not require re-bio-identification, and such that a test for bio-confirmation is maintained that results in a confirmation that allows for completion of authentication.

The authentication requests can be communicated to user-wearable devices from external sources the authentication requests can be user initiated originating from the user-wearable devices.

In at least one embodiment, the users are notified when encryption is initiated, in process, or completed. The encryption is provided for transmissions during transmission of a credential identifier to control a server.

The display portions display timepiece data. The display portions display transaction data.

The biometric data transceiver portion is adapted to read information from one or more of a group consisting of: a user's fingerprints, voice patterns, a body's electrical, chemical, physical, and biological characteristics, biotags, facial characteristics, skin pH, thermal characteristics, ocular characteristics, kinesthetics, and genetic make-up and wherein the users can include any member of a genus of an animal or plant kingdom.

The power is obtained via a battery, a solar cell, and/or electromagnetic and/or radiative coupling from an external source.

The transmissions sent or received by the transceiver and the biometric data transceiver portion of the transceiver provide internal and external user identity validation for the user-wearable devices that validate authentication via utilization of at least one distributed auto-synchronous array (DASA) database, wherein the DASA database contains and provides at least one authentication and encryption application.

The internal user identity validation occurs within the user-wearable devices and wherein the external user identity validation occurs external to the user-wearable devices.

The transmissions access and transmit a portion of data contained within the DASA database to user-wearable devices, validates data transmitted from the user-wearable devices with a portion of data within the DASA database, and further establishes validity of data according to a set of computational operations provides a set of rules residing in the DASA database that also can contain a portion or all of the data, such that all transmissions incoming to, held within, and outgoing from the sensors or any transceivers of the user-wearable devices, function securely and singularly for a specific, designated set of users.

The DASA database also provides one or more transmittable codes, wherein the codes originate within the at least one authentication and validation applications and wherein the user-wearable devices communicate internal and external by transmission and reception of data signals such that the internal transmission and reception is within the user-wearable devices and external transmission and receptions is external to the user-wearable devices.

Here, the codes are securitized in that the codes are not readily accessible from an external source or within the user-wearable devices without passing through a security check to ensure that proper access occurs, wherein proper access is access that is provided for only validated data transmissions from validated sources that also validates individuals or groups of individuals. In most embodiments the codes are encrypted.

The codes utilize either individually or collectively authentication, validation, and encryption applications that either individually or collectively authenticate, validate, and encrypt signals between detecting devices capable of searching, retrieving, analyzing, and validating the codes.

The codes are generated after installation of the authentication, validation, and encryption applications is complete. The codes are either recognizable or not recognizable by the user-wearable devices during attempted authentication and validation. In some cases the codes are selected from one or more of a group consisting of; a QR code, a bar code, a digital code, a temporal code, a binary code, an analogue code, and a 7-bit binary code.

The DASA database is accessed, manipulated, and arranged by the computer driven communication processor residing within said user-wearable devices.

In some embodiments transmissions are wireless and wherein the transmissions provide communications that are transmitted and received via oral, verbal, text, video, and data messaging and wherein the communications are displayed on the user-wearable devices.

In other embodiments one authentication comprises a challenge response computing operation utilizing transmissions wherein transmissions lead to one or more transactions. A challenge response system utilizes communications that contain implicit or explicit logic.

In other embodiments, implicit logic requires pre-arranged sets of data variables in a form of communications with one or more transceivers, so that authentication can proceed.

The explicit logic requires creation and analysis of different sets of data variables in the form of communications with one or more of transceivers, so that authentication can proceed.

In one or more embodiments at least one form of communications defines a credential identifier. The credential identifier comprises at least some form of data such as meta data combined with at least one authentication. The credential identifier comprises at least some form of data such as meta data combined with additional authentication requests. The communications includes at least one of the group consisting of meta data, authentication, and authentication requests are encrypted.

In many instances, the meta data includes an acknowledgement/nonacknowledgement portion that provides a path to determine access controlled by a server or user-wearable devices or both, the server and the user-wearable devices can become one or more transactions.

The communication processor can also include an authentication processor that performs a challenge response for the credential identifier by initially sending meta data to a server.

The authentication processor is an input/output processor module that sends and receives transmission signals to and from the server in response to reception of the credential identifier.

The communication processor is configured to transmit the credential identifier to access control of the server via a wireless communication link.

The communication processor includes an interface to data residing on the server and wherein a form of the data can be displayed on the user-wearable devices.

The server is configured to authenticate the credential identifier during comparison against entries of one or more keys within a set of data configuration tables residing in one or more DASA databases.

In further embodiments, the least one authentication and encryption application is secured in a secured DASA database within a secured cloud or other secured storage device utilizing the encryption application.

In another embodiment, the at least one authentication and encryption application employs a process as follows; a user of one or more user-wearable devices invokes secured transmission as attempts to acquire a key using one or more tolerance techniques that provide for a number of attempts to retrieve keys from a configuration table, wherein at least one authentication and encryption application possesses a get next key computational operation that is invoked locally on or in proximity to user-wearable devices.
application provides generation of encryption keys as well as a new master key, and simultaneous attempts are made to match one or more user identification (ID) encryption keys within a user ID encryption key database.

There is also included, a tolerance range that allows for a search of matching encryption keys that synchronize with the user ID encryption key database.

In addition, the at least one authentication and encryption application provides more layers of security in that now at least two authentication and encryption applications as well as encryption keys are required for the user-wearable devices so that a proper match is determined and establishes whether a user of the user-wearable devices is allowed access privileges.

If access is allowed, a user's user-wearable device provides via oral, visual, text, or data signal transmission, a display that provides at least a derivation of a match so that the user is notified and allowed access. The keys can be removed from a configuration table either before, during, or after a match, such that a key management system ensures that the keys themselves are neither discoverable nor compromised, wherein the keys cannot be found or if the keys are found they cannot be acted upon.

If access is denied, the user's user-wearable device provides via oral, visual, text, or data signal transmission a display that provides denial of a match.

Lack of matching causes at least one authentication and encryption application that resides with the user's user-wearable device is removed and wherein to further ensure that master keys in the configuration table are protected and secured, a new master table key is generated either via a signal from the user devices to one or more secured DASA database or via a signal from a key management system.

The communication processor invokes use of at least one of the group of interface consisting of a serial interface, a transmission control protocol (TCP) and the Internet Protocol (IP). (TCP/IP) interface, an Institute of Electrical and Electronic Engineers (IEEE) 802.11 interface, an IEEE 802.15.4 interface, and a secure Hypertext Transfer Protocol interface (HTTP).

In a separate but related embodiment, a method for transmitting and receiving data signals from one or more user-wearable secured transaction devices comprising: establishing communications with a transaction counterpart; selecting a transaction; reading and authenticating encrypted biometric data of a user of the devices; validating the user's biometric data; and transmitting an encrypted user identity validation upon successful validating of said user's biometric data, wherein transmissions sent or received by a transmissions transceiver portion of the devices is providing user identity validation for the devices via utilization of at least one DASA database that possesses an authentication and encryption application is provided.

Here the transmissions are accessing and transmitting a portion of data contained within the at least one DASA database to the user-wearable devices, validating data transmitted from the user-wearable devices with a portion of data held within the DASA database, and further establishing validity of data according to a set of rules for such data residing in the at least one DASA database such that all transmissions incoming to, being held within, and outgoing from circuits or transceivers of the devices, are functioning in a secure manner for a specific, designated set of users.

The DASA database is providing one or more transmissible, securitized, and encrypted codes, wherein the codes originate within the authentication and encryption application, and wherein the user-wearable devices communicate internally and externally by transmission and reception of data signals that utilize the authentication and encryption application and wherein transmissions transceiver portions function as detecting devices that search, retrieve, and analyze a code generated after installation of the authentication and encryption application is complete.

The codes are either recognizable or is not recognizable by the user-wearable devices during attempted authentication and validation. The communications can be enabled with Bluetooth technology and/or with infrared technology.

The transaction can be a purchase, a command, and/or control of a switch, and the transaction is selected from one or more of a group consisting of data, voice, and video transmissions that control hardware.

Here, a user's biometric data is electronically stored within one or more memory storage systems selected from any one or more of a group consisting of; memory chips, internal or external servers, and a cloud data storage medium, that exist internally to or externally from the devices.

In at least several embodiments, the communications are disabled until the user's data is authenticated and validated and/or re-authenticated and revalidated.

In a separate but related embodiment, the present disclosure also includes a system that employs one or more user-wearable transaction secured devices for transmitting to and receiving data from one or more user-wearable secured transaction devices to another, comprising: establishing communications with a transaction counterpart; selecting a transaction; reading and authenticating encrypted biometric data of one or more users of the devices; validating the users' biometric data; and transmitting users' identity validation upon successfully validating the users' biometric data, wherein transmissions sent or received by a transmissions transceiver portion of the devices is providing users identity validation for the devices via utilization of at least one DASA database that possesses an authentication and encryption application.

The transmissions are accessing and transmitting a portion of data contained within at least one DASA database to the user-wearable devices, validating data transmitted from the user-wearable devices with a portion of data held within the at least one DASA database, and further establishing validity of such data according to a set of rules for data residing in the auto-synchronized database such that all transmissions incoming to, being held within, and outgoing from circuits or transceivers of the devices, are functioning in a secure manner for a specific, designated set of users.

For this system, at least one DASA database provides one or more transmissible, securitized, and encrypted codes, wherein the codes originate within the authentication and encryption application, and wherein the user-wearable devices communicate internally and externally by transmission and reception of data signals that utilize the authentication and encryption application and wherein a transmissions transceiver portion functions as detecting devices that search, retrieve, and analyze a code generated after installation of the authentication and encryption application is complete.

As above, in many cases, the codes are either recognizable or not recognizable by the user-wearable devices during attempted authentication and validation.

BRIEF DESCRIPTION OF THE DRAWINGS

Embodiments of the present invention are presented in the following drawings.

DETAILED DESCRIPTION

Figure 1A:
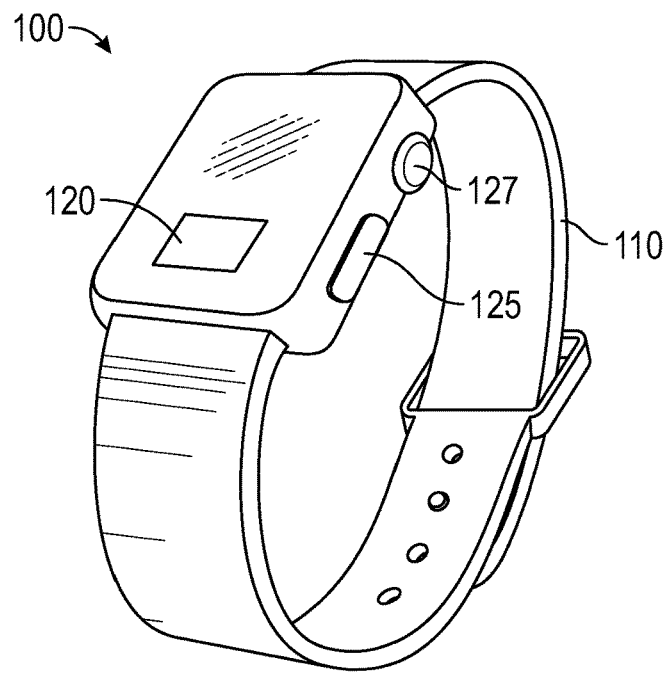
FIG. 1A illustrates one embodiment of a user-wearable device in the form of a wristwatch with a display for displaying data including time, date, and year.

Reference will now be made in detail to the one or more embodiments of the invention, examples of which are illustrated in the accompanying drawings.

These descriptions and representations provided so as to be understood by those skilled in the data processing arts to most effectively convey the substance of their work to others skilled in the art. A procedure, flow chart, logic block, process, etc., is here, and generally understood to be a self-consistent sequence of steps or instructions leading to a desired result. The steps are those requiring manipulations of physical quantities. Usually, though not necessarily, these quantities take the form of electrical, magnetic, and/or optical signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

For the purposes of this disclosure, the hierarchy associated with the user-wearable devices is a bottom up list as follows (meaning the hierarchy is a pyramid that begins at its pinnacle with circuits and ends at its base with transactions);

Circuits that connect to devices and carry signals. The circuits can carry signals in one or more directions and the circuits may also be connected to sensors.

(a) Signals. that travel via one or more circuits
(b) Transmissions, that travel via signals
(c) Communications, that are transmitted via transmissions carried via signals over or through circuits
(d) Authentication(s) which are achieved and confirmed after communications are sent or received;

and;

Transactions that occur once authentication(s) are properly validated and completed and then are sent and/or received.

It should be borne in mind, however, that all of these and similar terms are to be associated with appropriate physical quantities and are merely convenient labels applied to these quantities. Unless specifically stated otherwise as apparent from the following discussions, it is appreciated that throughout the present disclosure, discussions utilizing terms such as "setting," "storing," "scanning," "receiving," "sending," "disregarding," "entering," "establishing," "selecting," "reading," "validating," "transmitting," or the like, refer to the action and processes of a computer system or similar intelligent electronic computing device, that manipulates and transforms data represented as physical (electronic/magnetic/optical) quantities within the computer system's registers and memories into other data similarly represented as physical quantities that is recognized by the same or other computer system memories or registers or other such information storage, transmission or display devices.

This discussion of this embodiment of the present disclosure that addresses the use of wearable user-devices that provide transmission transactions, involving authentication and validation of a user's identity as an authorized user as well as encryption and decryption of data that is transmitted to, received by or otherwise resides on the devices themselves.

Figure 1B:
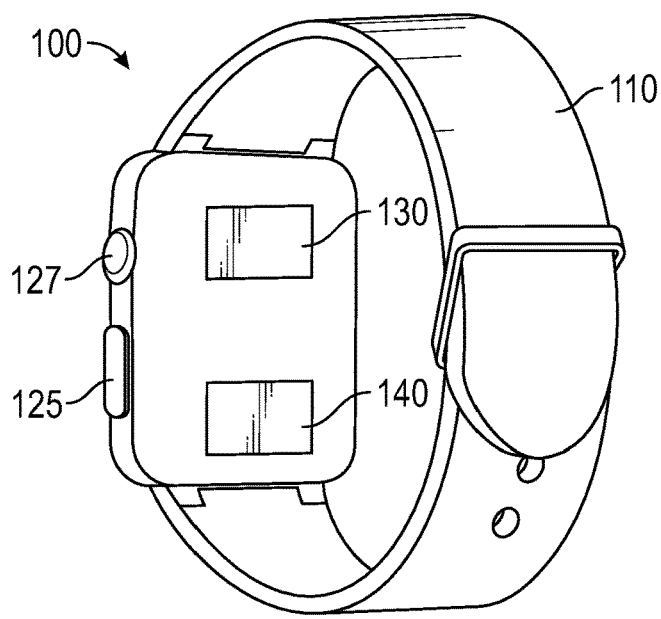
FIG. 1B illustrates a second embodiment of a user-wearable device in the form of a wristwatch indicating two back panels of the same display which contact the user's wrist.
Figure 2A:
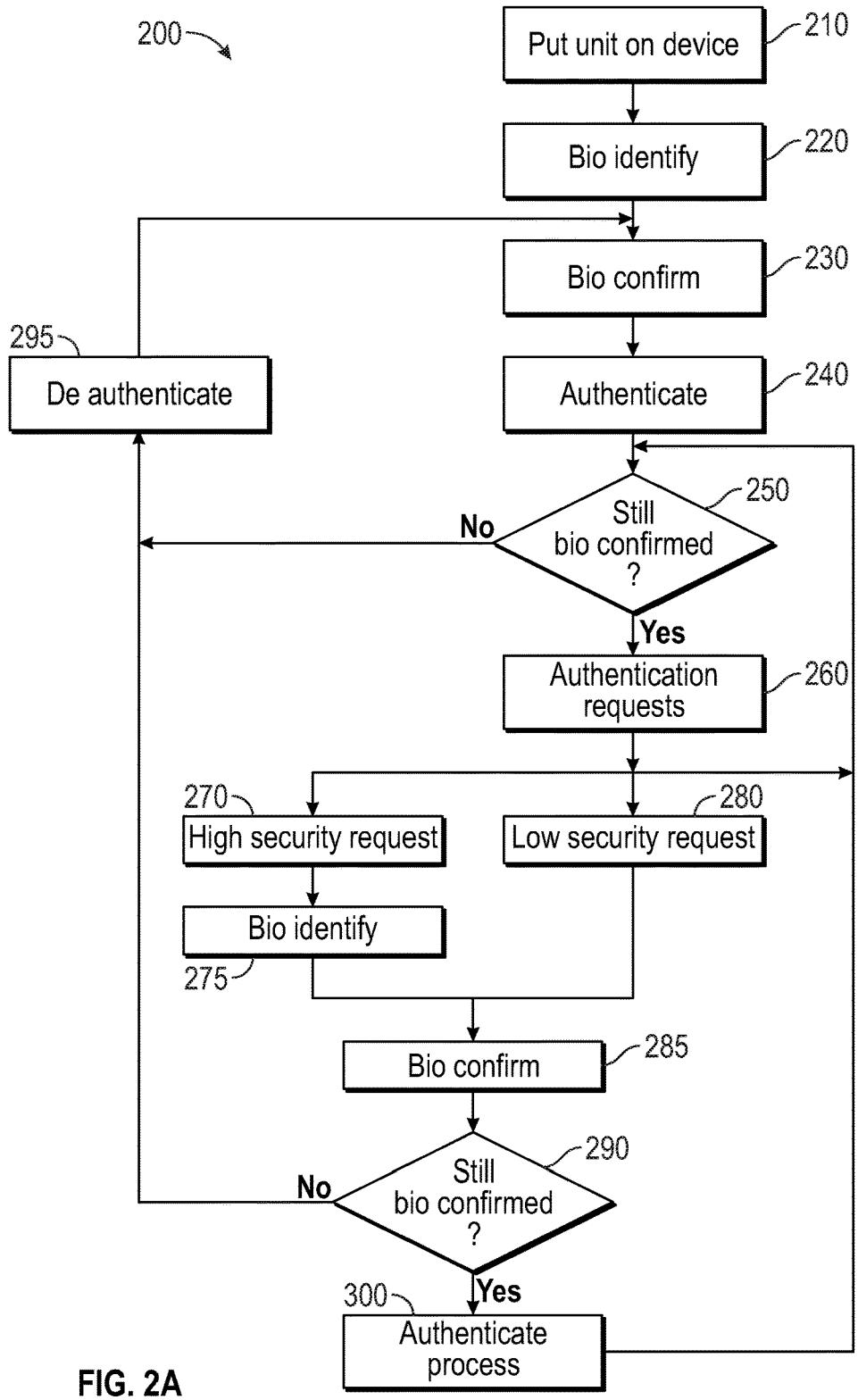
FIG. 2A is a flowchart indicating one technique by which a user is bio-identified and authenticated allowing and enabling the user to access and work with one or user-wearable devices.

FIG. 1A, illustrates one embodiment of a user-wearable device in the form of a wristwatch with a display for displaying data including time, date, and year. One embodiment of the present disclosure is a device in the form of a wristwatch that benefits from high security of the transmission of data as well as biometric authentication and verification while remaining convenient for detailed transactions. The security aspect is detailed below as it pertains to FIGS. 2A and 2B. For FIG. 1A, a user-wearable device (100) in the form of a wristwatch is shown with a wristband (110) which holds a panel and panel display portion (120). The user-wearable device in the form of a "smart watch" also provides for two additional features on the side of the panel and panel display portion (120) with a biometric transceiver shown as a sensor, including a mechanism for controlling power (125) to and from the device (100), as well as a scrolling mechanism (127) that allows for viewing information as necessary by the user. In FIG. 1B, the back portion of the device indicates two biometric transceivers shown as sensors (130 and 140) which can also act as sensor-scanners capable of transmitting, receiving, storing, and analyzing biometric data. This data from the user includes, for example a user's one or more fingerprints, voice patterns, body electrical characteristics, skin pH, thermal characteristics as well as all aspects of ocular characteristics. This data is used to authenticate and validate the user as earlier described in the summary of the invention, but is more specifically detailed according to the flow chart provided in FIGS. 2A and 2B. The data is transmitted via transmission that is encrypted and decrypted as required to ensure proper security. As stated above, the devices (100), have a housing with a computer driven communication processor fixedly mounted in the housing; one or more circuits fixedly mounted in the housing and communicatively coupled with the computer driven communication module; a power source electronically coupled with circuits; a display portion communicatively coupled with the circuits; at least one transmissions transceiver, and one or more biometric data transceivers (120, 130 and 140) in this case coupled with the back side of the display and electronically coupled with the circuits, transmissions transceiver, and with the communication module, wherein transmissions sent or received by the transmissions transceiver and the biometric data transceivers provide internal and external user identity validation for the devices. Validation is performed via utilization of at least one auto-synchronous database that possesses an authentication and encryption application. The transmissions access and transmit a portion of data contained within the auto-synchronized database to the user-wearable devices, validates data transmitted from the user-wearable devices with a portion of data within an auto-synchronous database, and further establishes validity of data according to a set of rules for data residing in the auto-synchronized database such that all transmissions incoming to, held within, and outgoing from the circuits or any of the transceivers of the devices (including 130 and 140), function securely and singularly for a specific, designated set of users. The DASA database provides one or more transmissible, securitized, and encrypted codes such that the codes originate within the authentication and encryption application. The user-wearable devices communicate internally and externally by transmission and reception of data signals that utilize the authentication and encryption application so that the transceivers can function as detecting devices that search, retrieve, and analyze a code generated after installation of the authentication and encryption application is complete. The code is either recognizable or is not recognizable by the user-wearable devices during attempted authentication and validation. In one set of embodiments, the code is selected from the group consisting of; a QR code, a bar code, a digital code, an analogue code, and a 7-bit binary code. The auto-synchronous database is manipulated by the computer driven communication processor residing within the user-wearable devices.

In a specific embodiment the process (200) is outlined in the flowchart of FIG. 2, whereby as the user puts the device on (210) to make it wearable. This initiates a bio-identification (220) process described above that requires user action to bio-identify themselves, followed by initial bio-confirmation (230), and then authentication of the user-wearer (240). If after this initial process, the bio-identity is continuously confirmed (250) then if there are authentication requests (260), the process for these requests is initiated. It is important to note that authentication requests can be communicated to the user devices from external sources, or that the authentication requests can be user initiated from the user devices. If the bio-confirmation is not still confirmed, a de-authenticate procedure (290) begins which requires that a bio-identification (220) process must be re-initiated.

Referring back to the authentication requests (260), an option exists for either high security requests (270) or low security requests (280). The higher security requests (270) requires that the users actively re-bio-identify themselves (275) to continue the authentication process. A test for bio-confirmation (285) is maintained (290) resulting in transmission confirmation (300).

For lower security requests (280) the re-bio-identification step (275) is not required. It is possible, based on the present embodiment to keep the ease of simple transactions unencumbered so that after the authentication request allowance (260) is performed, transmission to a lower security request occurs (280) and the transmission is allowed assuming that bio-confirmation (285) is maintained (290) resulting in transmission confirmation (300). Other security levels allowing for other authentication methods could also be invoked.

The choice here, regarding the encryption via the encryption application previously described will be according to the designer(s) of the user-wearable devices. Most likely encryption will be kept to a minimum for these lower security requests.

There are two feedback loops in continuous operation. The first loop continuously bio-confirms the user has not removed the device or that another user has taken the device. This loop returns to (250) which is the continuously confirmed bio-identity from either (260) ready to process authentication requests or (300) when an authentication request has been completed. The second loop de-authenticates the user (295) whenever the user has removed the device or another user has taken the device. These continuous feedback loops reassures the ability to ensure authentication.

Figure 2B:
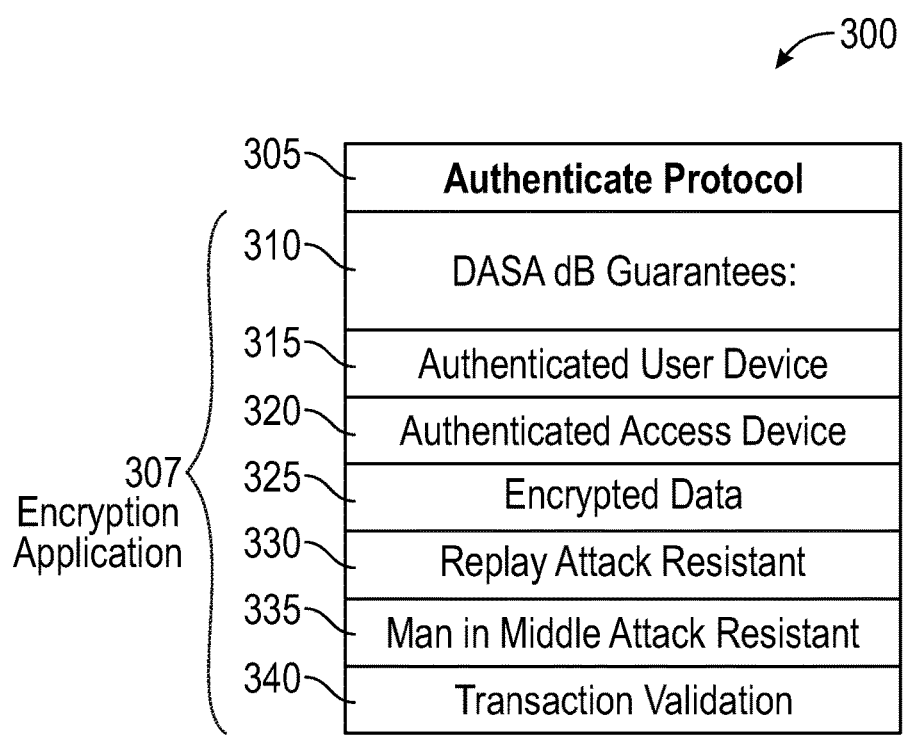
FIG. 2B is a flowchart and subsection the flowchart of FIG. 2A, indicating one technique by which transmissions to and from one or more user-wearable devices are provided with encryption technology.

Once transmission confirmation is reached (300) according to FIG. 2B, the authenticate protocol (305) triggers the use of the encryption application (307). This encryption application (307) utilizes the DASA database (310) and includes features (315, 320, 325, 330, 335, and 340) and guarantees a secure and specific connection with an authentic user is perfected (310). The authenticated user device (315) and the authenticated access device (320) are guaranteed by the synchronicity of keys within the DASA database.

The DASA database encryption also guarantees fully encrypted data and transmission (325) of the data. The synchronicity of the keys within the DASA database is what blocks the ability to replay any transaction (330). This blocking also prevents any third party "man-in-the-middle" piracy (335) from occurring, as the third party "hacker" would have to be able to establish the use of the continuously changing new codes to be able to confirm either bio-identity or to access the transmissions. Finally, the system ensures that the user of the wearable-user device is actually the user and not a third party requestor (340) by continuously checking biomarkers associated with the bio-identity of the user vs that of a "posing" requestor.

In the implementation of the embodiment envisioned, wearable-user devices can include a wearable piece of functional jewelry or other wearable accessories in addition to that of a smart watch. This implementation, not only houses the electronics and transceiver devices, it also provides both biometric and transmissions encryption applications to remove any security threat known. Note that, while this discussion focuses on the implementation of this embodiment as a smart watch which can function as a timepiece, many other implementations are envisioned, including wearable broaches, tie pins, cufflinks, belt buckles or even writing pens or PDA styli.

Both the aforementioned implementations of this embodiment of the present invention provide opportunity for multiple levels of security. By requiring multiple levels, the secure limitation of the operation of the transactional capabilities regarding these embodiments to a single, specific user is virtually impenetrable.

The range of applications regarding transmissions and associated transactions has no discernible limit. A few exemplary applications are outlined here in order to fully understand the need for securitizing such items as e-cash devices where the counterpart maybe an electronic wireless vending device. Another example could be the use of cars parking at a public parking meters or purchasing gasoline/diesel for automobiles, boats, or other modes of transportation. In fact the use of the user-wearable devices allows for the possible implementation of a proximity check that could be enabled by RF communications such as Bluetooth or use with GPS coordinates where it might be necessary to allow only very specific groups of users to access these transmissions and/or forms of communications. Military applications are also envisioned for essentially any war or peacetime activity where only certain individuals will be allowed access to the transmissions. Use of biometrics for each of these individuals could be based on various implantable wearable devices that emit signals specific only to that group.

The essence of these embodiments remains that of providing biometric data to validate a user's identity in order to authorize different transactions. Though the embodiments presented herein have focused on implementation of the present invention as a smart watch, other devices could be implemented including writing instruments, key chains or other items easily and normally worn by users.

The embodiments of the present invention discussed herein present various implementations of a user-wearable electronic wireless communication transaction device. These embodiments provide different ways to achieve an easy-to-incorporate form factor and convenience of operation in accomplishing transactions wirelessly and without physical contact between the user-wearable device and any applicable counterpart device.

While the invention will be described in conjunction with these embodiments, it will be understood that they are not intended to limit the invention to these embodiments. Contrarily, the specification is intended to cover inventive alternatives, modifications and equivalents, which may be included within the spirit and scope of the invention as defined by the appended claims. Furthermore, in the following detailed description of the present invention, numerous specific details are set forth in order to provide a thorough understanding of the present invention.

However, it will be obvious to one of ordinary skill in the art that the present invention may be practiced without these specific details.

In other instances, well-known methods, procedures, components, and circuits have not been described in detail so as not to unnecessarily obscure aspects of the present invention. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the later being the equivalent of back calculating the designated portion and verifying that it is within the range of tolerance.

The computer readable media described within this application is non-transitory. In most if not all cases, the transmission of data is transmitted via signals that are non-transitory signals.

In addition, each and every aspect of all three of these Provisional Applications are hereby fully incorporated by reference as well as each and every aspect of all references mentioned herein are hereby fully incorporated by reference.

In compliance with the patent laws, the subject matter disclosed herein has been described in language more or less specific as to structural and methodical features. However, the scope of protection sought is to be limited only by the following claims, given their broadest possible interpretations. These and other objects and advantages of the present invention will become obvious to those of ordinary skill in the art after having read the following detailed description of the preferred embodiments which are illustrated in the various drawing figures.

The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. One or more user-wearable transaction secured devices that transmit to and receive data from one or more said user-wearable transaction secured devices to another, comprising: a housing; a computer driven communication processor containing a microprocessor and data storage encryption capacity fixedly mounted in said housing; one or more circuits fixedly mounted in said housing and communicatively coupled with said computer driven communication processor; a power source coupled with said circuits; at least one transceiver including a biometric data transceiver portion coupled with said housing and coupled with said circuits and with said computer driven communication processor where one or more sensors are held within or on one or more surfaces of said user-wearable transaction secured devices;
   wherein said user-wearable transaction secured devices transmit and receive encrypted signals from one or more said user-wearable transaction secured devices to another that form specific transmissions determined by one or more users, to said transceiver and said biometric data transceiver portion of said transceiver;
   wherein said transceiver and said biometric data transceiver portion of said transceiver determines, via authentication and validation, identification of said users and confirms if said users are wearing said user-wearable transaction secured devices via utilization of said computer driven communication processor;
   wherein said computer driven communication processor provides, processes, and analyzes bio-identification, continuous bio-confirmation, and authentication of said users, wherein said authentication includes either high security or low security authentication requests;
   wherein transmissions sent or received by said at least one transceiver and said biometric data transceiver portion of said transceiver provide internal and external user identity validation for said user-wearable transaction secured devices that validate authentication via utilization of at least one distributed auto-synchronous array (DASA) database which provides a portion of data and a set of data rules necessary to validate transmissions transmitted and received between said user-wearable transaction secured devices for a specific, designated set of users of said user-wearable transaction secured devices.

2. The user-wearable transaction secured devices of claim 1, wherein said circuits are connected to sensors or said circuits themselves function as sensors.

3. The user-wearable transaction secured devices of claim 1, wherein said circuits are selected from the group consisting of; electronic, optical, and radiation emitting or receiving or both radiation emitting and receiving energized circuits that transmit and receive signals.

4. The user-wearable transaction secured devices of claim 1, wherein one or more display portions are communicatively coupled with said circuits.

5. The user-wearable transaction secured devices of claim 4, wherein said display portions display timepiece data or transaction data or both timepiece data and transaction data.

6. The user-wearable transaction secured devices of claim 1, wherein said housing is in a shape of a wristwatch, wherein said wristwatch incorporates features that provide functions for one or more devices selected from the group consisting of; a camera, a smartphone, a calculator, a global positioning system (GPS), a radio, a television, a door opener, a remote energy switching device, and a transceiver, wherein said transceiver is capable of acting as an (Internet Protocol) IP protocol data unit.

7. The user-wearable transaction secured devices of claim 1, wherein said housing is in a shape selected from the group consisting of; necklaces, broaches, rings, earrings, badges, belts, buckles, assorted jewelry, and articles of clothing.

8. The user-wearable transaction secured devices of claim 1, wherein said encrypted signals carry data that is transmitted and received by said at least one transceiver and wherein said at least one transceiver analyzes and acts upon instructions contained within said data.

9. The user-wearable transaction secured devices of claim 1, wherein said sensors are biometric sensors that provide biometric data that comprises information used to confirm or deny access to said user-wearable transaction secured devices.

10. The user-wearable transaction secured devices of claim 1, wherein said bio-identification initiates a process that requires user action to bio-identify users of said user-wearable transaction secured devices followed by initial bio-confirmation and then authentication of said users to enable one or more transactions.

11. The user-wearable transaction secured devices of claim 10, wherein said bio-identification is continuously confirmed by authentication requests where if bio-confirmation is not confirmed, a de-authenticate procedure is initiated that requires bio-identification confirmation to be re-initiated.

12. The user-wearable transaction secured devices of claim 11, wherein said authentication requests are high security requests that require users actively re-bio-identify themselves in order for said authentication requests to proceed and where a test for bio-confirmation is maintained that results in a confirmation that allows for completion of authentication.

13. The user-wearable transaction secured devices of claim 11, wherein said authentication requests are low security requests that do not require re-bio-identification, and where a test for bio-confirmation is maintained that results in a confirmation that allows for completion of authentication.

14. The user-wearable transaction secured devices of claim 11, wherein said authentication requests can be communicated to said user-wearable transaction secured devices from external sources or said authentication requests can be user initiated originating from said user-wearable transaction secured devices.

15. The user-wearable transaction secured devices of claim 1, wherein said users are notified when encryption is initiated, in process, or completed.

16. The user-wearable transaction secured devices of claim 15, wherein said encryption is provided for transmissions during transmission of a credential identifier to control a server.

17. The user-wearable transaction secured devices of claim 1, wherein said biometric data transceiver portion of said transceiver is configured to read information from one or more of a group consisting of: a user's fingerprints, voice patterns, a body's electrical, chemical, physical, and biological characteristics, biotags, facial characteristics, skin pH, thermal characteristics, ocular characteristics, kinesthetics, and genetic make-up and wherein said users can include any member of a genus of an animal or plant kingdom.

18. The user-wearable transaction secured devices of claim 1, wherein transmissions sent or received by said transceiver and said biometric data transceiver portion of said transceiver provide internal and external user identity validation for said user-wearable transaction secured devices that validate authentication via utilization of said (DASA) database, wherein said (DASA) database contains and provides at least one authentication and encryption application.

19. The user-wearable transaction secured devices of claim 18, wherein said transmissions access and transmit a portion of data contained within said (DASA) database to said user-wearable transaction secured devices, validates data transmitted from said user-wearable transaction secured devices with a portion of data within said (DASA) database, and further establishes validity of data according to a set of computational operations that provides a set of rules residing in said (DASA) database and that also can contain a portion or all of said data, where all transmissions incoming to, held within, and outgoing from said sensors or any transceivers of said user-wearable transaction secured devices, function securely and singularly for a specific, designated set of users; wherein said (DASA) database also provides one or more transmittable codes, wherein said transmittable codes originate within at least one authentication and at least one validation application and wherein said user-wearable transaction secured devices communicate internal and external by transmission and reception of data signals where internal transmission and reception is within said user-wearable transaction secured devices and external transmission and reception is external to said user-wearable transaction secured devices.

20. The user-wearable transaction secured devices of claim 19, wherein said transmittable codes are securitized in that said transmittable codes are not readily accessible from an external source or within said user-wearable transaction secured devices without passing through a security check to ensure that proper access occurs, wherein proper access is access that is provided for only validated data transmissions from validated sources that also validates individuals or groups of individuals and wherein said transmittable codes are encrypted.

21. The user-wearable transaction secured devices of claim 19, wherein said transmittable codes utilize either individually or collectively authentication, validation, and encryption applications that either individually or collectively authenticate, validate, and encrypt signals between detecting said user-wearable transaction secured devices capable of searching, retrieving, analyzing, and validating said transmittable codes.

22. The user-wearable transaction secured devices of claim 19, wherein said transmittable codes are selected from one or more of a group consisting of: a QR code, a bar code, a digital code, a temporal code, a binary code, an analogue code, and a 7-bit binary code.

23. The user-wearable transaction secured devices of claim 18, wherein data within said (DASA) database is accessed, manipulated, and arranged by said computer driven communication processor residing within said user-wearable transaction secured devices.

24. The user-wearable transaction secured devices of claim 18, wherein said at least one authentication and encryption application is secured in a secured (DASA) database within a secured cloud or other secured storage device utilizing at least one encryption application.

25. The user-wearable transaction secured devices of claim 18, wherein at least one authentication and encryption application employs a process as follows:
   a user of one or more said user-wearable transaction secured devices invokes secured transmission as attempts to acquire a key using one or more tolerance techniques that provide for a number of attempts to retrieve keys from a configuration table, wherein at least one authentication and encryption application possesses a get next key computational operation that is invoked locally on or in proximity to said user-wearable transaction secured devices.

26. The user-wearable transaction secured devices of claim 25, wherein at least one authentication and encryption application provides more layers of security in that now at least two authentication and encryption applications as well as encryption keys are required for said user-wearable transaction secured devices so that a proper match is determined and establishes whether a user of said user-wearable transaction secured devices is allowed access privileges.

27. The user-wearable transaction secured devices of claim 26, wherein if access is denied, said user's user-wearable transaction secured device provides via oral, visual, text, or data signal transmission on a display a denial of a match.

28. The user-wearable transaction secured devices of claim 26, wherein lack of matching causes at least one authentication and encryption application that resides with said user's user-wearable transaction secured device to be removed and wherein to further ensure that master keys in said configuration table are protected and secured, a new master table key is generated either via a signal from said user-wearable transaction secured devices to one or more secured (DASA) database or via a signal from a key management system.

29. The user-wearable transaction secured devices of claim 1, wherein said communication processor invokes use of at least one of the group of interfaces consisting of a serial interface, a transmission control protocol (TCP) and Internet Protocol (IP) (TCP/IP) interface, an Institute of Electrical and Electronic Engineers (IEEE) 802.11 interface, an IEEE 802.15.4 interface, and a secure Hypertext Transfer Protocol (HTTP) interface.

30. A system that employs one or more user-wearable transaction secured devices for transmitting to and receiving data from said one or more user-wearable transaction secured devices to another, comprising: said one or more user-wearable transaction secured devices that transmit to and receive data from one or more said user-wearable transaction secured devices to another, further comprising: a housing; a computer driven communication processor containing a microprocessor and data storage encryption capacity fixedly mounted in said housing; one or more circuits fixedly mounted in said housing and communicatively coupled with said computer driven communication processor; a power source coupled with said circuits; at least one transceiver including a biometric data transceiver portion coupled with said housing and coupled with said circuits and with said computer driven communication processor where one or more sensors are held within or on one or more surfaces of said user-wearable transaction secured devices;

wherein said user-wearable transaction secured devices transmit and receive encrypted signals from one or more said user-wearable transaction secured devices to another that form specific transmissions determined by one or more users, to said transceiver and said biometric data transceiver portion of said transceiver;

wherein said transceiver and said biometric data transceiver portion of said transceiver determines, via authentication and validation, identification of said users and confirms if said users are wearing said user-wearable transaction secured devices via utilization of said computer driven communication processor;

wherein said computer driven communication processor provides, processes, and analyzes bio-identification, continuous bio-confirmation, and authentication of said users, wherein said authentication includes either high security or low security authentication requests;

wherein transmissions sent or received by at least one transceiver and said biometric data transceiver portion of said transceiver provide internal and external user identity validation for said user-wearable transaction secured devices that validate authentication via utilization of at least one distributed auto-synchronous array (DASA) database which provides a portion of data and a set of data rules necessary to validate transmissions transmitted and received between said user-wearable transaction secured devices for a specific, designated set of users of said user-wearable transaction secured devices.

* * * * *